United States Patent [19]

Dreier et al.

[11] Patent Number: 5,024,540
[45] Date of Patent: Jun. 18, 1991

[54] SHAFT BEARING WITH A BALL SOCKET IN A FRAME-MOUNTED HOUSING

[75] Inventors: Friedrich Dreier, Lauf; Ernst Fischer, Gernsbach, both of Fed. Rep. of Germany

[73] Assignee: Robert Bosch GmbH, Stuttgart, Fed. Rep. of Germany

[21] Appl. No.: 389,599

[22] Filed: Aug. 4, 1989

[30] Foreign Application Priority Data

Aug. 4, 1988 [DE] Fed. Rep. of Germany ... 8809963[U]
Oct. 12, 1988 [DE] Fed. Rep. of Germany ....... 3834691

[51] Int. Cl.⁵ ............................................. F16C 25/04
[52] U.S. Cl. .................................................. 384/203
[58] Field of Search ............... 384/203, 204, 210, 192, 384/208, 209

[56] References Cited

U.S. PATENT DOCUMENTS

| | | | |
|---|---|---|---|
| 4,591,276 | 5/1986 | Schneider et al. | 384/203 |
| 4,615,638 | 10/1986 | Ito | 384/203 |
| 4,887,916 | 12/1989 | Adam et al. | 384/192 |
| 4,910,424 | 3/1990 | Borcherding | 384/209 |

*Primary Examiner*—Lenard A. Footland
*Attorney, Agent, or Firm*—Michael J. Striker

[57] ABSTRACT

The shaft bearing with a ball socket is mounted in a substantially cylindrical cavity in a frame-mounted housing. The shaft is guided through the ball socket. The ball socket rests in a bearing seat in the housing formed at a bottom of the cavity and is pressed in the bearing seat by a structural member having a pre-stressed spring means providing a spring force, whereby the ball socket being movable in a radial direction against the spring force from the bearing seat. The structural member has a dish-like base, whose diameter is larger than the diameter of the cavity and, as part of the spring means, a plurality of resilient tongues supported by the base belonging to the structural member extending at least approximately in opposite directions, whose free ends extending away from each other rest on the bearing under compression and whose ends facing each other are connected with the base.

6 Claims, 1 Drawing Sheet

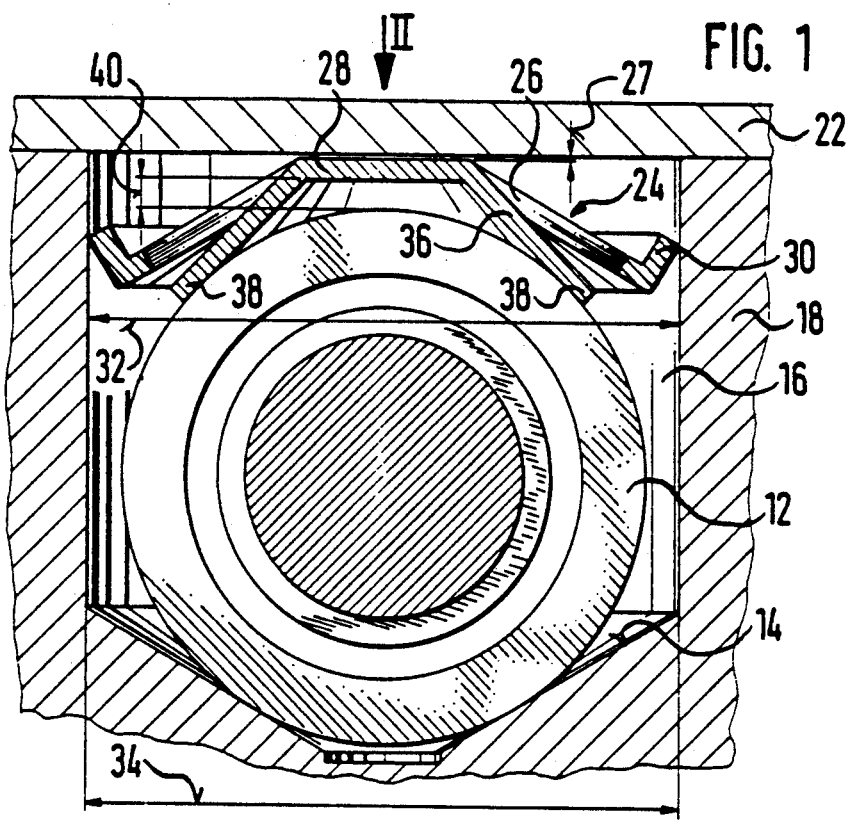
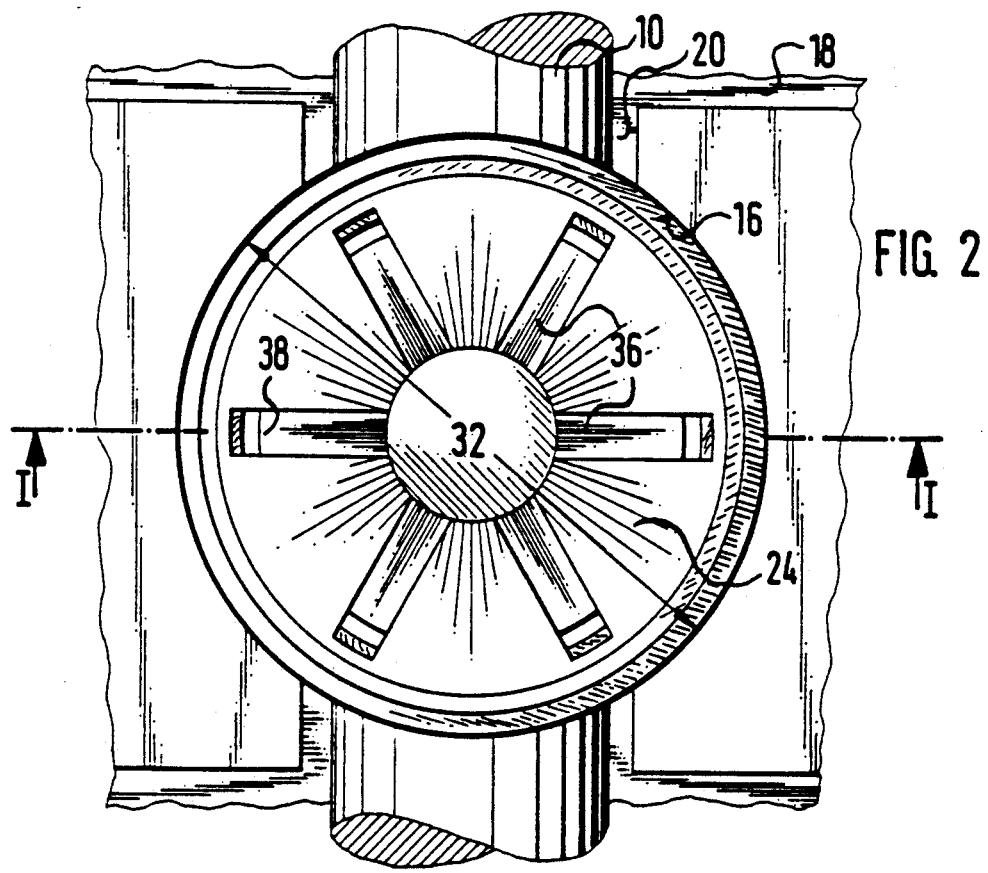

SHAFT BEARING WITH A BALL SOCKET IN A FRAME-MOUNTED HOUSING

BACKGROUND OF THE INVENTION

Our invention relates to a bearing for a shaft or shaft bearing located in a ball socket in a frame-mounted housing.

A shaft bearing for a shaft is known with a ball socket mounted in a substantially cylindrical cavity in a frame-mounted housing. The shaft is guided through the ball socket. The ball socket rests in a bearing seat in the housing formed at a base of the cavity and is pressed in the bearing seat by a structural member having a prestressed spring means providing a spring force, whereby the ball socket is movable in a radial direction against the spring force from the bearing seat.

These bearings are used in a positioning drive having a worm drive in which a ball socket receives the free end of a worm-gear shaft connected in one piece with the drive shaft of an electric drive motor. Especially, when the component to be moved, for example a sliding roof of a motor vehicle, is blocked, and the motor is still not switched off, the worm-gear shaft is bent elastically in the region of engagement to the worm gear. So that the shaft bearing is not jammed and/or broken, the free end of the worm-gear shaft guided in the ball socket can be adjusted to this bending. Therefore the ball socket must be rotatable and be liftable out from its bearing seat. After the bending back of the elastic worm-gear shaft the ball socket should be again returned to its initial position. The spring means provides for the required restoring force and should provide a certain ball socket-rotational moment reliably in all allowed rotational directions. The reason for the arrangement of the shaft in a ball socket is to provide a simple bearing operation and assembly of the drive, since the ball socket automatically compensates for alignment errors of the bearing passage or cavity.

A shaft bearing is described in German Open Patent Application DE-OS 23 51 062, in which the spring means are formed by a U-shape spring clip, whose U-legs are clamped at their free ends by an angle piece between the housing and the housing cover. The spring clip presses with its U-base engaged on the ball socket under compression on the ball socket, because the height of the U-shaped clip is less than the portion of the ball socket projecting above the angle piece. The spring clip rests thus only pointwise on the central portion of the ball socket, so that the ball socket rotational moment is not guaranteed to be equal in all directions.

SUMMARY OF THE INVENTION

It is an object of our invention to provide an improved shaft bearing for a shaft, especially a worm-gear shaft, with a ball socket in frame-mounted housing, in which the ball socket rotational moment in all directions is substantially equal.

In keeping with these objects and with others which will become apparent hereinafter, the structural member comprises a dish-like base, whose diameter is larger than the diameter of the cavity and a plurality of resilient tongues supported by the base belonging to the structural member extending at least approximately in opposite directions, whose free ends extending away from each other rest on the bearing under compression and whose ends facing toward each other are connected with the base.

The ball socket is pressed by the comparatively widely separated free ends of the resilient tongues toward a plurality of sides or directions so that the ball socket rotational moment is comparatively equal in all sides and directions. A very compact structure of the ball socket bearing is provided by our invention. Finally the structural member automatically locks in the cavity of the frame, because it is compressed in the approximately smaller cavity on assembly.

The resilient tongues advantageously may be cut from the structural member and may be pressed out from the structural member toward the side closest to the bearing. A housing cover may be provided for the bearing and the structural member can comprise an annular lip formed like a truncated cone in cross section connected to an edge of the dish-like base, whose larger diameter is adjacent the housing cover. The structural member can be made from a resilient material, such as spring steel.

BRIEF DESCRIPTION OF THE DRAWING

The objects, features and advantages of our invention will be made more apparent from the following detailed description, reference being made to the accompanying drawing in which:

FIG. 1 is a side elevational view of a bearing according to our invention taken along the section line I—I in FIG. 2, and FIG. 2 is a top plan view on the bearing of FIG. 1 seen in the direction of the arrow II of FIG. 1 with the bearing cover removed.

DETAILED DESCRIPTION OF THE INVENTION

A worm-gear shaft 10 (which is one example) of a shaft shown in FIG. 1 in cross section is guided with its one end in a ball socket 12. The other, unshown end of the worm-gear shaft is connected in one-piece with the armature shaft of an unshown electric drive motor. The ball socket 12 sits in a bearing seat 14, which is formed in a known way. The bearing seat 14 is located at the base of a cavity 16, which is provided in a frame-mounted housing 18. As indicated particularly in FIG. 2, the cavity 16 is a substantially cylindrical passage. The worm-gear shaft end 10 crosses the cavity 16 in a transverse groove 20 located in the housing 18 in such a way that the axis of the cavity 16 and the axis of the worm-gear shaft intersect at approximately right angles. The depth of the cavity 16 is such that the ball socket 12 is located completely in the cavity 16 when the ball socket 12 sits in its bearing seat 14. Additionally the cavity 16 is covered with a housing cover 22. The bearing seat 14 is shaped like a truncated cone so that ball socket 12 fits the worm-gear shaft 10 without difficulty and can be adjusted to it. To keep or maintain a definite ball socket rotational moment a structural member 24 having spring means is mounted between the housing cover 22 and the ball socket 12, so that the ball socket 12 is pressed in the direction of the arrow II in the bearing seat 14. The structural member 24 has a dish-shaped base 26 and an annular lip 30 shaped like a truncated cone in cross section connected to the dish edge, whose large diameter 32 (FIG. 2) is located closest to the housing cover 22. Further it is of significance that the large diameter 32 of the annular lip 30 is slightly larger than the diameter 34 of the substantially cylindrical cavity 16. When the structural member 24 is inserted in the cavity 60 in the direction of the arrow II in FIG. 1, its outer edges with a diameter 32 engage or bite everywhere on the wall of the cavity 16, so that the structural member 24 can no longer move in a direction of the arrow II from the cavity 16.

Since a certain spacing 27 remains between the inner side of the cover 22 and the dish-like base 26, the cover 22 is not loaded by the allowed lifting out of the ball socket 12 from the bearing seat 14. Further the base 26 of the structural member 24 has six spring-like resilient tongues 36, of which always two are located in pairs directed opposite each other. The tongue pairs extend themselves at least approximately in opposite directions. The end portions facing toward each other of each spring-like tongue pair are connected in one piece with the base 26 of the structural member 24. In contrast to that the free ends 38 of the resilient tongues 36 are cut out from the base 26 of the structural member 24 as is clearly indicated in FIG. 1. There it is apparent that the tongues in the dish are pressed through inwardly so that in their free end portions 38 they contact on the outer surface of the bearing 12. Since the structural member 24 is advantageously made from spring steel, a satisfactory retention of the structural member 24 on the wall of the cavity 16 results. Furthermore according to the degree the resilient tongues 36 in the dish are pressed through the size of the bearing-rotational moment is selectable. Finally it is still of significance that a certain play indicated with the reference character 40 remains between the dish base 28 and the upper section of the bearing 12 facing it, so that the bearing 12 can give against the force of the prestressed resilient tongues 36 opposite the direction II in the cavity 16—also in the radial direction relative to the rotation direction of the shaft of the bearing 10 until gripped by the dish base 28 and held. After unloading the bearing 12 the resilient tongues 36 press it again onto the bearing seat 14.

It will be understood that each of the elements described above, or two or more together, may also find a useful application in other types of structures differing from the types described above.

While the invention has been illustrated and described as embodied in a bearing with a ball socket in a frame-mounted housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims; What is claimed is:

1. In a bearing for a shaft with a ball socket mounted in a substantially cylindrical cavity in a frame-mounted housing, said shaft being guided through said ball socket, said ball socket resting in a bearing seat in said housing formed at a bottom of said cavity and pressed in said bearing seat by a structural member having a prestressed spring means providing a spring force, whereby said ball socket is movable in a radial direction against said spring force from said bearing seat, the improvement wherein said structural member has a dish-like base, whose diameter is larger than a diameter of said cavity and has a plurality of resilient tongues acting as said spring means supported by said base of said structural member and extending at least approximately in opposite directions, said tongues having free ends extending away from each other to rest on said ball socket under compression and other ends facing toward each other connected with said base.

2. The improvement according to claim 1, wherein said resilient tongues are cut from said structural member and are pressed out from said structural member toward a side of said structural member closest to said ball socket.

3. The improvement according to claim 1, further comprising a housing cover, said structural member having an annular lip formed like a truncated cone in cross section and connected to an edge of said dish-like base, whose larger diameter is closest to said housing cover.

4. The improvement according to claim 1, wherein said structural member is made from an resilient material.

5. The improvement according to claim 4, wherein said resilient material is spring steel.

6. A bearing-shaft assembly, comprising a shaft formed as a worm-gear shaft and a bearing including a ball socket mounted in a substantially cylindrical cavity in a frame-mounted housing, said shaft being guided through said ball socket, said ball socket resting in a bearing seat in said housing formed at a bottom of said cavity and pressed in said bearing seat by a structural member having a prestressed spring means providing a spring force, whereby said ball socket is movable in a radial direction against said spring force from said bearing seat, said structural member having a dish-like base, whose diameter is larger than a diameter of said cavity and which has a plurality of resilient tongues acting as said spring means supported by said base of said structural member and extending at least approximately in opposite directions, said tongues having free ends extending away from each other to rest on said ball socket under compression and other ends facing toward each other connected with said base.

* * * * *